United States Patent [19]

Baurecht et al.

[11] 3,917,556
[45] Nov. 4, 1975

[54] PIGMENT PASTES

[75] Inventors: Heinz-Ewald Baurecht, Cologne; Manfred Preuss, Hilden; Karlheinz Wolf, Leverkusen; Reinhold Hornle, Cologne, all of Germany

[73] Assignee: Bayer Aktiengesellschaft, Leverkusen, Germany

[22] Filed: June 21, 1974

[21] Appl. No.: 481,875

[30] Foreign Application Priority Data

June 22, 1973 Germany............................ 2331790
Feb. 1, 1974 Germany............................ 2404978

[52] U.S. Cl. ......... 260/33.2 R; 260/40 TN; 427/445
[51] Int. Cl.²........................................ C08L 75/06
[58] Field of Search.................. 260/40 TN, 33.2 R; 427/445

[56] References Cited
UNITED STATES PATENTS

3,401,143   9/1968   Finelli et al. .................... 260/40 TN
3,813,361   5/1974   Gillis et al. .................... 260/33.2 R

*Primary Examiner*—Donald E. Czaja
*Assistant Examiner*—S. M. Person
*Attorney, Agent, or Firm*—Plumley & Tyner

[57] ABSTRACT

Pigment pastes, containing as the binder 3–20% by weight of a polyester-polyurethane, which is obtained by reaction of a polyesterpolyol of average molecular weight 500–3,000, based on hexanediol or butanediol-1,4 and adipic acid with isphorone diisocyanate or dicyclohexylmethane-4,4'-diisocyanate and subsequent lengthening of the molecular chain by means of isophorone-diamine and as the solvent at least 20–90% by weight of ethylene glycol monoalkyl ether, are universally suitable for the colouring of one-component polyester-polyurethane textile coating compositions.

4 Claims, No Drawings

PIGMENT PASTES

The invention relates to pigment pastes and their use for colouring one-component polyester-polyurethane textile coating compositions.

It is known to colour textile coating compositions, based on polyester-polyurethanes, with pigment pastes. The pigment pastes used for this purpose in most cases contained the pigment, customary additives such as solvents, and binders based on polyvinyl chloride/polyvinyl alcohol, optionally with the addition of customary plasticisers based on alkyd resins or epoxide resins, or customary polymer plasticisers.

These pigment preparations have an adverse effect on the properties of the coatings, especially on the dry textile handle, the gloss, the resistance to hydrolysis or the resistance to folding.

Attempts have been made to avoid these disadvantages by using the same polyester-polyurethane as a binder for the pigment pastes as that used for the coating. Whilst this enabled the abovementioned disadvantages to be avoided, it is a disadvantage that it is necessary to prepare an accurately matched pigment paste range for every special coating composition, since polyester-polyurethanes are of only limited compatibility with one another or with their solutions in, for example, dimethylformamide.

There was therefore a need for pigment pastes which are universally applicable for all one-component polyester-polyurethane textile coating compositions and in addition do not adversely influence the properties of the textile coating, such as textile handle, gloss and the like.

In view of the difficulties hitherto known, it must be described as extremely surprising that it has been possible to find, in the pigment pastes described below, an agent which can be used universally for colouring one-component polyester-polyurethane textile coating compositions without adversely modifying the properties of the coating.

Hence, the invention relates to pigment pastes containing 3-20% by weight of an alphatic polyester-polyurethane as the binder, which is obtained by reaction of a polyester-polyol of average molecular weight 500-3,000, based on hexanediol, optionally with the addition of neopentyl glycol, or based on 1,4-butanediol, and adipic acid, with isophorone-diisocyanate or dicyclohexylmethane-4,4'-diisocyanate and subsequent lengthening of the molecular chain by means of isophoronediamine, 3-70% by weight of a pigment, 20-90% by weight of ethylene gylcol monoalkyl ether and optionally up to 40% by weight of customary solvents, such as aromatic hydrocarbons, aliphatic alcohols, low molecular ketones, low molecular esters or mixtures of these compounds.

Suitable solvents are methanol, ethanol, isopropanol, isobutanol, cyclohexanol, clycol monomethyl ether, glycol monoethyl ether, acetone, methyl ethyl ketone, methyl isobutyl ketone, cyclohexanone, methyl acetate, ethylglycol acetate, benzene, toluene and xylene.

The invention further relates to the use of these pigment pastes for colouring one-component polyester-polyurethane textile coating compositions and to the one-component polyester-polyurethane textile coating compositions coloured therewith.

The pigment pastes can be prepared in a simple manner by dispersing the components in a customary wet comminution apparatus, for example in a high speed rotor-stator mill, a pearl mill or a ball mill. The particle size of the pigment dispersed in the paste should be less than $2\mu$.

There is no restriction on the pigments which can be incorporated into the pastes. They can be inorganic or organic in nature.

Suitable organic pigments are, for example, those of the azo, anthraquinone, azaporphine, thioindigo or polycyclic series, as well as of the quinacridone, dioxazine, naphthalene-tetracarboxylic acid or perylenetetracarboxylic acid series, and also dyestuff lakes, such as Ca, Mg and Al lakes of dyestuffs containing sulphonic acid groups and/or carboxylic acid groups, of which a large number is known, for example from the Colour Index, 2nd edition. Examples of suitable inorganic pigments are zinc sulphides, cadmium sulphides/-cadmium selenides, ultramarine, titanium dioxides, iron oxides, nickel- or chromium-titanium yellow, cobalt blue, chromium oxides and chromate pigments, as well as carbon black.

One-component polyurethane coating compositions which can be coloured with the pigment pastes according to the invention are described in Melliand Textilberichte 11/51 (1970), 1,313-1,317; 9/52 (1971), 1,094-1,099 and 53 (1972), 1,272-1,277.

Pigment pastes which contain, as the binder, 3-20% by weight of a polyester-polyurethane obtained from a polyester of molecular weight 1,000 to 2,000, prepared from hexanediol, neopentyl alcohol and adipic acid or butanediol and adipic acid, isophoronediisocyanate and isophoronediamine and, as the solvent, 0-40% by weight of isopropanol or isobutanol, 0-40% by weight of toluene and 20-85% by weight of a glycol monoalkyl ether, especially the monoethyl ether or methyl ether, are particularly advantageous.

Thickeners and fillers, such as Aerosils, bentonite or kaolin, can be added to the pigment pastes according to the invention

EXAMPLE 1

40 g of a titanium dioxide pigment (rutile type), 0.1 g of a high molecular silicic acid containing approx. 17% of $Al_2O_3$ and 60 g of a 12% strength solution of a polyester-polyurethane of average molecular weight 100,000, which is prepared by chain lengthening a prepolymer with isophoronediamine, in a mixture of 20% of isobutanol, 20% of toluene and 60% of glycol monoethyl ether, are dispersed by means of a customary wet comminution apparatus, for example a rotor-stator mill from Messrs. Janke & Kunkel, Staufen i.Br., of the Ultra-Turrax type, until the agglomerate size is less than $2\mu$. The white paste thus prepared does not have a tendency to sediment and is outstandingly suitable for pigmenting one-component polyester-polyurethane textile coating compositions.

The prepolymer is prepared from hexanediol-neopentyl gylcol (2:1) and adipic acid and has an average molecular weight of 1,700.

EXAMPLE 2

10 g of a surface-oxidised carbon black and 90 g of an 8% strength solution of a polyester-polyurethane of average molecular weight 100,000, which has been prepared by chain lengthening a prepolymer with isophoronediamine, in a solvent mixture of 20 g of isopropanol, 20 g of toluene and 100 g of glycol monomethyl ether, are stirred in a dissolver and subsequently ground for 30 minutes in a pearl mill. The black paste thus produced is outstandingly suitable for pigmenting one-component polyurethane textile coating compositions. The prepolymer is prepared from 1,4-butanediol, adipic acid and isophoronediisocyanate and has an average molecular weight of 2,000.

EXAMPLE 3

35 g of a micronised iron oxide pigment and 65 g of the polyester-polyurethane solution of Example 1 are ground for 36 hours in a ball mill. The red paste thus prepared can be used like the pastes of Examples 1 and 2.

EXAMPLE 4

10 g of a commercially available copper phthalocyanine pigment in the β-modification and 90 g of the polyester-polyurethane solution of Example 2 are ground for 48 hours in a ball mill. A blue paste which is outstandingly suitable for pigmenting one-component polyester-polyurethane textile coating compositions is obtained.

EXAMPLE 5

10 g of the white paste of Example 1 are introduced, with stirring, into 100 g of a 25% strength solution of a polyurethane elastomer in a solvent mixture of dimethylformamide and methyl ethyl ketone (3:2). This material is applied by means of a doctor, using a 300 um gap width, onto an undyed textile web. After passing through a customary drying oven at temperatures of 100°–150°C, a very glossy opaque textile coating is obtained.

We claim:
1. Pigment pastes containing 3–20% by weight of an aliphatic polyester-polyurethane as the binder, which is obtained by reaction of a polyester-polyglycol of average molecular weight 500–3,000, based on hexanediol, optionally with the addition of neopentyl glycol, or based on 1,4-butanediol, and adipic acid, with isophoronediisocyanate or dicyclohexylmethane-4,4'-diisocyanate and subsequent lengthening of the molecular chain by means of isophoronediamine, 3–70% by weight of a pigment, 20–90% by weight of ethylene glycol monoalkyl ether and optionally up to 40% by weight of customary solvents.

2. Pigment pastes according to claim 1, containing, as the binder, 3–20% by weight of an aliphatic polyester-polyurethane which is obtained by reaction of a polyester-polyglycol of average molecular weight 1,000–2,000, based on hexanediol/neopentyl glycol or 1,4-butanediol and adipic acid with isophoronediisocyanate and subsequent chain lengthening with isophoronediamine, 3–70% by weight of a pigment, 0–40% by weight of isopropanol or isobutanol, 0–40% by weight of toluene and 20–85% of glycol monomethyl ether or glycol monoethyl ether.

3. One-component polyester-polyurethane textile coating compositions coloured with pigment pastes of claim 1.

4. Process for coloring one component polyester polyurethane textile coating compositions which comprises dispersing 3 to 20% by weight of an aliphatic polyester-polyurethane as binder and 3 to 70% by weight of a pigment in 20 to 90% by weight of ethylene glycol monoalkyl ether and optionally up to 40% by weight of customary solvents wherein the said binder has an average molecular weight of 500 to 3000 and is formed by reaction of hexanediol, a mixture of hexanediol and neopentyl glycol, or 1,4-butanediol with adipic acid and with isophorone diisocyanate or dicyclohexylmethane-4,4'-diisocyanate and subsequent lengthening of the molecular chain by means of isophoronediamine.

* * * * *